3,211,697
PHOSPHORICAMIDE POLYMERS
Stanton A. Harris, Westfield, N.J., and John P. Hummel,
Iowa City, Iowa, assignors to State University of Iowa,
Iowa City, Iowa
No Drawing. Filed June 27, 1961, Ser. No. 119,825
4 Claims. (Cl. 260—47)

This invention relates to new polymers of unknown constitution. More specifically, this invention relates to new polymers prepared by the reaction of an N-lower alkyl-N-phenyl-N',N" -bis(hydroxyphenyl)phosphorictriamide with phosphorous oxychloride in a basic solvent, the said polymer being characterized by a molecular weight greater than 10,000, a ratio primary to secondary acidic hydrogens of about 1.0 to 0.8 and a nitrogen-phosphorous atomic ratio of 1:1. More specifically, also, this invention relates to a method of retarding the coagulation of mammalian blood which comprises administering at least 8 mg. per kg. of the above polymer.

We have found a new polymeric substance which is prepared by the reaction of certain substituted phosphorictriamides as described above with phosphoroxychloride in the presence of a basic solvent. The structures of these are unknown. The products, however, have been found to have molecular weights varying from about 11,000 up to almost 30,000. Higher molecular weights are obtainable by further condensation of terminal groups in another manner to form insoluble polymers. The ordinary polymers of the above molecular weight range have been found also to have both primary and secondary acidic hydrogens, a fact which indicates the presence of a phosphoric acid or a monoesterified phosphoric acid group or groups. These products have also been found to have an N:P atomic ratio of about 1:1. These properties indicate that the product is not in all probability a polymeric phosphate with polymerization caused by esterification of the phenolic hydroxyls since the nitrogen ratio and the number of primary acidic hydrogens would in that case be quite different. Further, primary polymerization through the esterification of the alcohol groups is achieved by using a deficiency of POCl$_3$ while our polymers are made using a large molar ratio of POCl$_3$ to phosphorictriamide. Such linear polymers have quite different properties. In all probability, a polymerization reaction involving the central atom occurs, but we have not been able to characterize the repeating unit of this polymer. The higher molecular weight insoluble polymers are formed by a slow hydrolysis of the terminal phosphoric dichloride groups with apparently a concomitant further polymerization by the linking up chains of such polymers through the terminal phosphoric groups. Such water insoluble polymers have a much lower ratio of primary acidic hydrogens to secondary ones.

The polymers of our invention has a number of utilities. One remarkable one is that simple polymers of the invention act to retard the coagulation of mammalian blood. No representation is made that this is to be used in humans. However, it has been found to be quite effective as an anti-coagulant in other mammals at dosages greater than 8 mg. per kg. Moreover, unlike synthetic anti-coagulants of the substituted polyethylene type, this polymer is degraded slowly in vivo and this is less likely to induce symptoms of chronic toxicity. The compounds are usually administered parenterally, especially intravenously.

These polymers, being phosphoric acid derivatives, are, of course, strong acids. The free acid form of the usual form of the polymer is insoluble in alcohol and somewhat soluble in water. Further, neither the free acid form nor the salt form will pass a semi-permeable membrane.

These properties form the basis for another utility for the polymers of our invention, namely as an easily-removed acid catalyst in organic reactions. Many organic reactions are catalyzed by acids and in some cases it is very difficult to separate the mineral acid catalyst from the reaction mixture afterwards. The polymers of our invention can thus be used to catalyze such reactions and then can be removed by dialysis or filtration as desired, depending on the solvent being used. An example of such a utility is in the esterification of an organic carboxylic acid with an alcohol, using excess alcohol as the solvent. In most cases the excess alcohol will readily dissolve the ester which is formed. By the use of our polymers as the acid catalyst, the alcohol solution of the ester can be separated from the catalyst by simple filtration and the ester recovered from the filtrate by evaporation of the excess alcohol. Other reactions which can be run in aqueous solution and which need a mineral acid catalyst can be carried out using the free acid form of the polymers of our invention as the catalyst, followed by separation of the product from the catalyst by dialysis.

These higher molecular weight polymers are also useful as ion exchange resins for the removal of cations from aqueous solution, especially metallic ions.

Another utility for the polymers of our invention is as a base for aminoplast resins. These polymers contain both esterified phenolic groups and amide linkages. The reaction with formaldehyde can occur on the amide linkages or on the phenolic rings in the manner normally associated with phenolics and aminoplasts. The reaction can be carried out in the manner usually used in the preparation of such resins. Since the polymers are themselves acids they provide the acid catalyst usually needed to carry out the polymerization of such thermosetting resins.

In the preparation of the products of our invention an intermediate phosphoric triamide is stirred with excess phosphorous oxychloride in an inert solvent. The reaction mixture is then diluted and acidified to precipitate the acid form of the polymer. This product can then be purified by dissolution in caustic.

The solvent used may be any basic solvent capable of acting as an acid-binding agent. Examples of such solvents are pyridine, the picolines, the lutidines, dimethylaniline and the like. The lutidines, especially 2,6-dimethylpyridine, are preferred, since there is less tendency toward unwanted side reactions and colored products.

The intermediate triamide use to form the polymer of our invention is as follows—

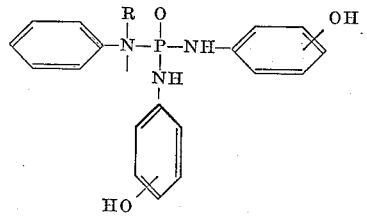

in which R can be any lower alkyl such as methyl, propyl, butyl, isopropyl and the like and the hydroxyl group may be on any position of the phenyl rings. These intermediate phosphoric triamides are prepared by the reaction of the benzyloxyphenyl aniline of the desired configuration with a phenylalkylphosphoric dichloride. This reaction also is carried out in an inert solvent having acid-binding characteristics such as described above. The product which is isolated from this reaction is then subjected to hydrogenolysis over palladium, a treatment which removes the benzyl group, leaving the free hydroxyls.

This polymerization reaction with POCl$_3$ is carried out at room temperatures varying from that of an ice bath to about room temperature, preferably about 0–10° C. followed by warming to room temperature. Higher initial temperatures tend to induce unwanted side reactions and form colored products.

The POCl$_3$ is used in molecular quantities of at least 4 moles per mole of phosphoric triamide. The use of a large excess of POCl$_3$ is necessary to induce the unknown type of polymerization involving the central group is contrast to polymerization by esterification of phenolic hydroxyls, which is induced by a deficiency of POCl$_3$ and gives products of different characteristics.

The free acid form of the polymers of our invention are insoluble in water and alcohol. In contrast, the alkali metal salts and substituted ammonium salts are soluble. Other salts such as the heavy metal salts are also insoluble in water. For many of the purposes of our invention, the salts are equivalent to the free acid. In use as an anticoagulant the water-soluble salts are preferably used. As acid catalysts, one, of course, will use the free acid form.

Our invention can be illustrated by the following examples:

*Example 1*

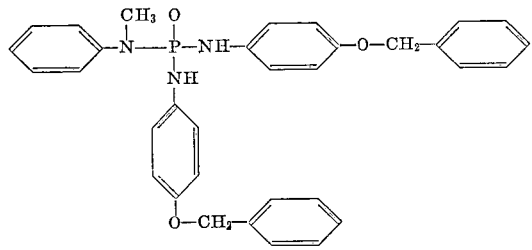

To a solution of 44 g. (0.22 mole) of freshly prepared 4-benzyloxyaniline in 100 ml. of dried lutidine is added 17 ml. (0.1 mole) of freshly distilled N-methyl-N-phenylphosphoramidichloride. After heating on a steam bath for two and a half hours and standing overnight at room temperature, water and 500 ml. ether are added to the solution. The lutidine hydrochloride dissolves and the product, N-methyl-N-phenyl - N',N" - bis(4-benzyloxyphenyl)phosphorictriamide, slowly crystallizes out of the ether layer. The product is filtered and washed successively with water, 2 N HCl and water. Its melting point is 171–173°. After crystallization from alcohol the melting point is 174°. Yield 47 g., 85%.

*Analysis.*—Calcd. for $C_{33}H_{32}N_3O_3P$: C, 72.11; H, 5.87; N, 7.65; P, 5.64. Found: C, 71.90; H, 5.94; N, 7.60; P, 5.36.

When N-ethyl or N-phenylphosphoramidichloride is used in equivalent quantities in place of the N-methyl compound, the corresponding N-alkyl-phosphorictriamide is obtained.

When 2-benzyloxyaniline or 3-benzyloxyaniline is used in place of the 4-benzyloxyaniline, the correspondingly substituted benzyloxy derivative is obtained as the final product.

*Example 2*

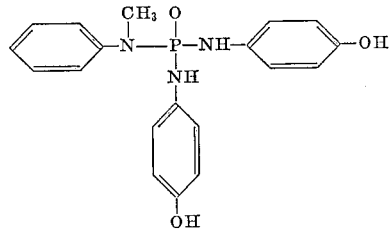

A total of 30.75 g. of N-methyl - N - phenyl-N',N"-bis(N-4-benzyloxyphenyl)phosphorictriamide is reduced in three batches with hydrogen and 10% PdCl$_2$ on carbon catalyst in hot ethanol solution. With each gram is used 1 g. of catalyst and 250 ml. of absolute alcohol per batch. The starting material is sparingly soluble in the alcohol, so the suspension is kept hot during the hydrogenation. The speed of the hydrogenation is controlled by the rate of solution of the starting material. The resulting solution is filtered through Super-Cel (siliceous or diatomaceous earth-fossil flour-kieselguhr) to remove the catalyst and the filtrate is concentrated to about 150 ml. Crystallization is caused by adding an equal volume of hot water, from which most of the air has been expelled. The product is recrystallized from 150 ml. of alcohol by adding an equal volume of hot water and allowing to stand in a refrigerator until crystallization is complete. It is filtered and dried in an oven at 70° for 5½ hours. Yield 16.1 g., 78%, M.P. 223–225°. Additional material is obtained by working up the mother liquors. This is dark in color due to air oxidation. The total yield of N-methyl-N-phenyl - N',N" - bis(4 - hydroxyphenyl) phosphorictriamide is thus raised to 92–93%.

*Analysis.*—Calcd. for $C_{19}H_{20}N_3O_3P$: C, 61.78; H, 5.46; N, 11.38; P, 8.50. Found: C, 61.58; H, 5.13; N, 11.23; P, 8.29.

When any of the other homologs or isomers described at the end of Example 1 are used in equivalent quantities, the corresponding products are obtained.

*Example 3*

Dry solid N-methyl-N-phenyl-N',N"-bis(4 - hydroxyphenyl)phosphorictriamide (3.69 g., 0.01 mole) is added in small portions to a solution of 4 ml. (0.045 mole) of freshly distilled phosphorous oxychloride in 50 ml. of lutidine. The reaction is carried out in an ice bath while stirring with a magnetic stirrer. An additional 10 ml. of dry lutidine and 50 ml. of benzene are added to facilitate stirring of the nearly solid mass of lutidine hydrochloride. It is stirred for one hour in the ice bath and for one-half hour at room temperature. It is again cooled and decomposed with 50 g. of ice. Concentrated hydrochloric acid is added in small portions to the ice cooled mixture until the solution is strongly acid and no more precipitation occurs. The solution is decanted from the gummy residue and the latter is washed twice by swirling with water. The precipitate is not soluble in alcohol, but slurrying in alcohol allows the material to be granulated by grinding. This material is soluble in 0.1 N NaOH from which it reprecipitates on acidification. The solution is filtered to remove a gelatinous precipitate and neutralized. Upon treatment with an excess of barium acetate an insoluble barium salt is precipitated. This is filtered, well washed with water and dried in an oven at 70°.

*Analysis.*—Calcd. for $C_{19}H_{18}N_3O_9P_3Ba_2$: N, 5.25; P, 11.62. Found: N, 5.14, 5.09; P, 11.60.

This compound is converted to the soluble sodium salt by shaking with a slight excess of sodium sulfate solution.

When any of the homologs or isomeric products prepared in Example 2 are used in the above procedure, polymers of similar properties are obtained.

When the reaction mixture is slowly diluted by the addition of water dropwise instead of being decomposed with a large amount of ice, most of the polymer is obtained in the form of the gelatinous precipitate which is not soluble in 0.1 N NaOH. This product is isolated and dried for use as an ion exchange resin.

We claim:

1. A polymer prepared by the reaction of an N-loweralkyl-N-phenyl - N',N" - bis(hydroxyphenyl)phosphoric triamide with at least 4 moles of POCl$_3$ per mole of said triamide at temperatures above 0° C. in an organic tertiary amine solvent, said polymer being characterized by the solubility of the alkali salts of said polymers in water.

2. A polymer of claim 1 which is water-soluble, said polymer being characterized by having an average of two acidic hydrogens on each terminal phosphate.

3. The polymer of claim 2 in which the N-lower alkyl group is methyl.

4. The polymer of claim 3 in which the hydroxyphenyl is 4-hydroxphenyl.

References Cited by the Examiner
UNITED STATES PATENTS

| | | | |
|---|---|---|---|
| 2,678,335 | 5/54 | Lester | 260—543 |
| 2,682,521 | 6/54 | Coover | 260—47 |
| 2,715,091 | 8/55 | Ricketts | 167—65 |
| 2,846,413 | 8/58 | Reeves et al. | 260—47 |
| 2,899,358 | 8/59 | Sperber | 167—65 |

WILLIAM H. SHORT, *Primary Examiner.*

MORRIS O. WOLK, *Examiner.*